Patented May 22, 1934

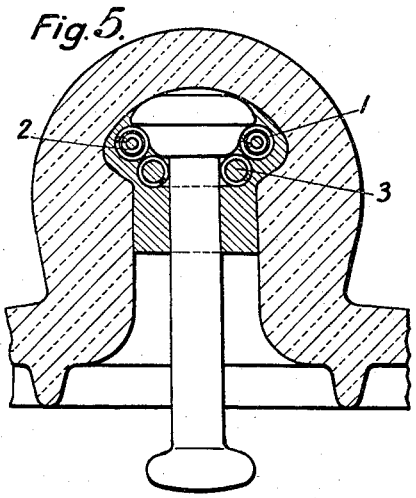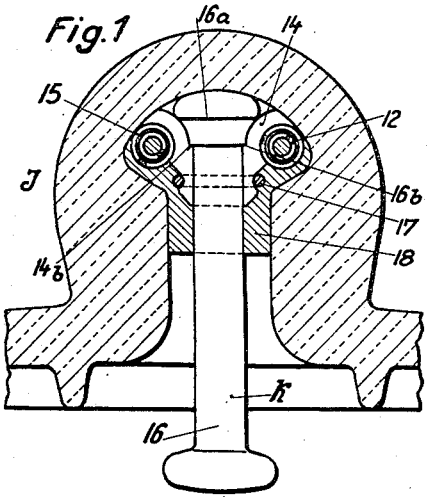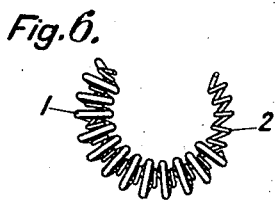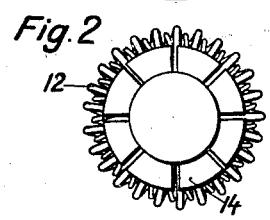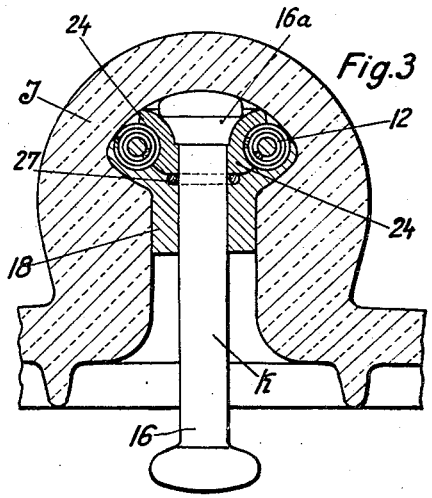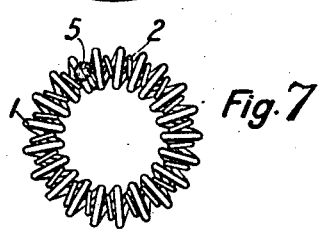

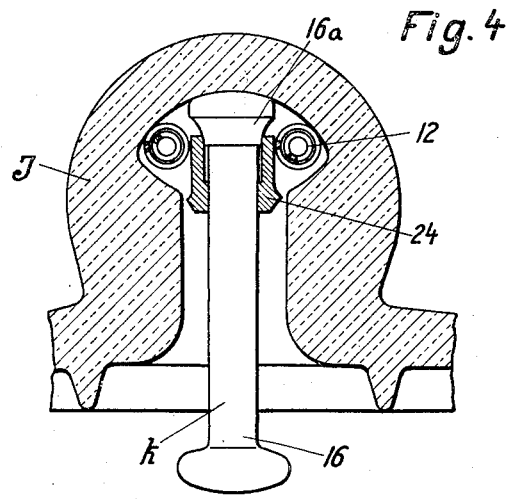
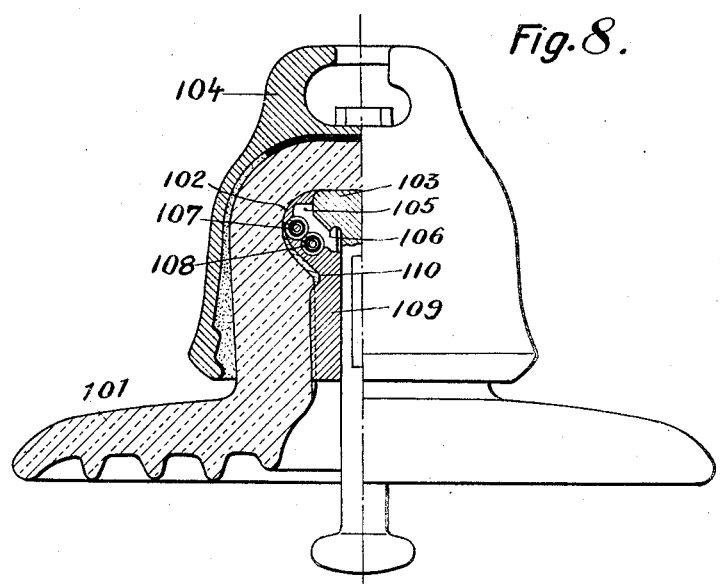

1,960,190

UNITED STATES PATENT OFFICE 1,960,190

SUSPENSION INSULATOR

Wilhelm Regerbis and Otto Paul Ziesche, Hermsdorf, Germany, assignors to Hermsdorf-Schomburg-Isolatoren Gesellschaft mit beschrankter Haftung, Hermsdorf, Germany Application December 3, 1929, Serial No. 411,354
In Germany December 5, 1928

8 Claims. (Cl. 173—318)

The present invention relates to improvements in or modifications of electrical insulators as described and shown in the patent to William Weicker No. 1,851,882, which issued March 29, 1932.

In the coil-ring insulator which forms the subject of the said patent the pin is secured in the upwardly diverging pin-cavity by an annular wire coil of circular cross-section which, after the insertion of the pin in the pin-cavity, is slipped over the shaft of the pin and is so inserted between the pin and the inwardly flaring wall of the pin cavity as to bear with its inner circumference against a suitably profiled collar of the pin. The coil which may be reinforced by the insertion of balls expands into its natural shape on passing into the divergent portion of the pin-cavity, lies against the cavity on the lower side of the pin-head and transmits in conjunction with the cast-in metal, the tensional forces on the shaft to the body of the insulator against which it presses at the shoulder where the divergent portion of the pin-cavity joins the cylindrical portion or throat.

We have found that this insulator may be materially improved by increasing the surface of the insulator constituted by the above-mentioned shoulder which takes up the tension on the pin, i. e., the bearing surface, thus reducing the specific mechanical stress on the insulator. This may be effected for example by dimensioning the diameter of the pin-head in excess to the diameter of the throat of the cavity and by forming the head of a plurality of parts which may be successively introduced into the cavity and composed therein to constitute the head. This makes it possible to choose the diameter of the annular coil independently of the maximum diameter of the head of the pin, and to make the diameter of the annular coil greater than in previous constructions. We may also divide the coil into a plurality of individually inserted sections, the coil diameter of which is larger than is possible with a unitary annular coil.

A further object of our invention is to improve the manufacture of the coils and their strengthening and fixing to the shaft of the pin during the casting operation.

Certain embodiments of the invention will now be described with reference to the accompanying drawings:

Fig. 1 shows in longitudinal section the arrangement of the pressure transmitting coil between the composite head of the pin and the flaring wall of the cavity.

Fig. 2 shows a plan view of the composite head of the pin with the coil applied.

Figs. 3 and 4 show another construction of the composite head, and illustrate its assembly.

Figs. 5, 6 and 7 show preferred methods of fixing the annular wire coil during the filling of the pin-cavity by casting, and of reinforcing the coil.

Fig. 8 depicts, partly in axial section, an insulator having a composite pin-head and two annular wire coils.

In the insulators of the type to which our invention relates, the head of the pin was so profiled prior to our invention as to contact with the inner circumference of the wire coil only. The surface transmitting the pressure between the annular coil and the shoulder formed by the divergent portion of the pin recess joining the throat of the pin-recess, is at the most equally as large as the pressure transmitting contact surface between the coil and the pin-head. Consequently, the bearing surface of the wire coil on the insulator or on the cast-in metal between them constituting a pressure transmitting surface is limited. According to our invention an enlarged composite pin-head is used for increasing the pressure transmitting surfaces of the pin-head, the annular coil and the flaring cavity wall.

In the embodiment shown in Figs. 1 and 2 the insulator body J is provided with a pin-cavity wherein a headed pin K is inserted. Between the pin and the inwardly flaring wall of the cavity an annular wire coil of circular cross-section is inserted which bears with its inner circumference against the head of the pin. The assembly of the insulator shown in the above mentioned patent to Weicker is effected by first inserting the pin in the cavity and by subsequently slipping the annular coil over the shaft of the pin and by introducing it through the throat of the cavity. When the coil has resumed its annular shape and is properly placed, a metal filling is cast into the cavity to fill the free space therein and to assist the coil in transmitting the axial stress from the head to the flaring wall of the cavity. In its simplest form the annular coil comprises an helix which after being wound is bowed to form a ring.

According to our invention, however, the head of the pin is composed of a core 16a and of individual segmentary members 14 arranged about the shaft of the pin and bearing against the core 16a from below. This arrangement permits of a different manner of assembling the parts, as will be explained hereinafter.

The pin is provided with a shoulder 16b, against which recesses 14b of the segmentary blocks 14 abut. The members 14 are preferably pressed against the shaft of the pin by a resilient ring 17, such as for example a split-ring. Thus, it will appear that the surface transmitting pressure from the composite head to the annular coil and from the latter to the flaring wall of the insulator cavity is very appreciably increased in comparison with the structure shown in the afore-mentioned patent to Weicker. It no longer is limited by the diameter of the throat.

The assembly of the insulator is effected in the following manner: First the annular wire coil 12 is inserted into the pin-cavity 15 and then the pin 16 is brought into the position shown. Subsequently, the segments 14 are inserted between the core 16a of the head and the coil 12 whereby the latter is expanded to a greater diameter, and the desired increase in the pressure transmitting surface is effected. Then, the split ring 17 is placed in position. Finally the pin is secured by casting in metal 18 into the interior of the cavity.

The intermediate members 14 between the core of the head and the annular coil may be constructed as an integral element as shown in Fig. 3 wherein the same reference numerals as in Figs. 1 and 2 are used to denote identical parts. The element consists of a collar 24 which initially has a cylindrical form as shown in Fig. 4. The collar or sleeve 24 is placed over the shaft of the pin, preferably before its lower head is forged, and is then forced in any suitable manner onto the head of the pin and thus expanded so that it assumes the shape shown in Fig. 3. The collar is then fixed to the shaft of the pin by suitable securing means such as a linchpin 27 carried on the shaft. Finally, the metal 18 is cast in.

The purpose of the annular wire coil is to transmit the entire tensional forces axially acting on the pin to the insulator body. The requisite rigidity is provided either in the coil itself, for example by the use of a correspondingly thick wire, or by the insertion of reinforcing members which as is proposed in the above-mentioned patent to Weicker may have the form of steel balls inserted into the interior of the coil. We have found it preferable to use as a strengthening body for the annular coil a wire spiral which is inserted in the interior of the annular coil in the same manner as the balls in the previous arrangement. The incline of this supporting spiral must be opposed to the incline of the annular coil so that the individual turns are crossing one another and are adapted to act as supports for each other.

This construction is represented in Figs. 5, 6 and 7. Fig. 5 shows an insulator of the general type known prior to our invention, that is to say, without increased pressure transmitting surface, in which we have provided a second wire spiral 3 for fixing the annular wire coil 1. Fig. 6 illustrates the structure of the annular wire coil preferably employed in the insulator of Figs. 1 and 3. As will appear from this illustration, a second oppositely wound wire spiral 2 of correspondingly smaller coil diameter may be inserted in the annular wire coil 1 to reinforce the same.

This supporting spiral may advantageously be used for connecting the abutting ends of the spiral which is bent to form the annular wire coil. Prior to our invention, the connection of these two ends has customarily been effected by soldering and it has been found to be advantageous to provisionally hold the ends of the spiral together by means of a small pin or peg which consists of a few turns of wire and to solder this peg to the two ends of the annular coil. The supporting spiral 2 as shown in Fig. 7 may be directly used as such a peg to which the ends 5 of the annular wire coil are soldered.

It will be noted that all of the embodiments heretofore described except that shown in Fig. 5 differ from that shown in the above mentioned patent to Weicker in that the coil diameter of the annulus exceeds the width of the gap between the pin and the walls of the throat, thereby providing for a comparatively large pressure transmitting surface between the annular coil on the one hand and the flaring wall of the cavity on the other hand. Obviously, this arrangement can not be used unless provision is made permitting the annular coil to be introduced before the introduction of the pin into the cavity. Hence, an important feature of our invention is to be seen in an assembly permitting of dimensioning the coil diameter in excess to the width of the aforementioned gap.

Exhaustive tests have shown that insulators of the type shown in the afore-mentioned patent to Weicker, wherein a single annular wire coil, reinforced and kept in place by a metal filling, is used for transmitting the pressure from the pin-head to the walls of the cavity, can not be given any desired dimensions, because, in case of very large dimensions, the pressure to be transmitted by the annular wire coil reaches an excessive amount and, hence, will cause the metal filling positioned between the coil and the wall of the cavity to be squeezed aside. This is objectionable, however, because this metal filling serves to uniformly distribute the pressure from the individual windings of the coil over the flaring wall of the cavity.

In some of the embodiments heretofore described, the pressure transmitting surface is increased by use of a pin having a composite head exceeding in diameter the throat.

We have found that the pressure transmitting surface and, consequently, the tensile strength of the insulator may further be increased by substituting a plurality of annular wire coils of smaller coil diameter for the single wire coil of larger coil diameter.

In Fig. 8 we have illustrated such an embodiment. The chain-insulator 101 is formed with a cavity 102, the restricted throat of which is just sufficiently wide to permit the core 103 of the pin-head to enter. The insulator 101 is formed in the customary manner and fitted with the customary cap 104 cemented to the insulator head.

The head of the pin is formed by the core 103 and by a plurality of individual segments 105 surrounding the core and being so profiled as to engage with their hook-shaped projections 106 a suitable recess provided in the core. Thus, the segments 105 may be placed upon their introduction into the cavity to assume a definite position on the core 103. The diameter of the composite pin-head 103, 105 exceeds the diameter of the throat of the cavity so that the opposed pressure transmitting faces on the flaring wall of the cavity and on the pin-head are large in comparison with those of the insulator shown in the afore-mentioned patent to Weicker.

An important feature of novelty of this embodiment resides in the provision of two annular wire coils 107 and 108, each of which has a comparatively small coil diameter. These wire coils may be introduced into the cavity after the segments 105 have been placed in position. Preferably, the composite pin-head is formed with annular recesses serving to receive the annular coils in predetermined positions.

When the annular coils have been introduced, they are secured in position by a suitable metal filling, for instance by lead, cast into the cavity to fill the free space thereof as indicated at 109.

Preferably, the flaring wall of the cavity is covered with a layer 110 of suitable insulating material to promote uniform distribution of the pressure over the walls which, being of porcelain, must be protected from excessive pressure concentrated in single points.

This embodiment is particularly adapted to transmission of extraordinary high pressures as the pull exerted on the core 103 is first transmitted to the segments 105 which, in their turn, distribute it uniformly over both annular wire coils. These coils, however, have a sufficiently large surface to preclude an excessive pressure exerted on the metal filling.

A particularly favorable effect results from the fact that between both coils the metal filling is enclosed in form of a wedge and is thus prevented from escaping in lateral direction in case it should tend under excessive forces to assume, as it were, a semi-liquid state. The metal filling at this point will be kept in place between both coils and will be, thus, positively forced to transmit pressure. In this effect, a considerable advantage over the use of a single coil is to be seen, as a single coil will tend to urge the metal filling aside in the manner of a wedge.

While in Figs. 1 and 3 the pin head is composed of a number of elements to permit of its introduction in spite of its diameter being larger than that of the throat of the cavity, we sometimes prefer a different arrangement. We may use an integral pin-head, for instance, and a composite insulator body, the parts of which are assembled upon the introduction of the head.

What we claim is:—

1. An electric insulator comprising an insulator body provided with a pin cavity having an inwardly flaring wall, a pin having an enlarged head inserted in said cavity, an annular wire coil of circular cross-section inserted between said pin and said wall and bearing with its inner circumference against said head, and a metal filling poured into said cavity to fill the free space therein, said annular wire coil being composed of two nested wire helices wound in opposed directions and bent to an annulus.

2. The combination set forth in claim 1 in which the outer one of said wire helices has its ends soldered to the inner one.

3. An electric insulator comprising an insulator body provided with a pin cavity having an inwardly flaring wall, a pin having a head composed of a core integral with the shaft of said pin and of a mantle surrounding said core and being dimensioned to exceed in diameter the throat of said cavity, and an annular wire coil of circular cross-section inserted between said pin and said wall and bearing with its inner circumference against said head, and a metal filling poured into said cavity to fill the free space therein, said mantle being formed by a plurality of segments held together in place on the core of the head by a split ring surrounding them.

4. An electric insulator comprising an insulator body provided with a pin cavity having an inwardly flaring wall, a pin provided with an enlarged head at its inner end, a segmental mantle surrounding said pin head and being dimensioned to exceed in diameter the throat of said cavity and also being spaced from the wall of said throat to afford unobstructed access to the free space in the cavity, an annular wire coil of circular cross section inserted between said pin and said wall and bearing with its inner circumference against said mantle, and a metal filling poured into said cavity to fill the free space therein and surrounding and embedding said wire coil.

5. An electric insulator comprising an insulator body provided with a pin cavity having an inwardly flaring wall, a pin having a central core and a segmental metal head exceeding in diameter the throat of said cavity, the parts constituting said head being dimensioned to permit insertion through the throat of said cavity, said head being spaced from the wall of said throat to afford unobstructed access to the free space in the cavity, an annular wire coil of circular cross section inserted between said pin head and said wall and bearing with its inner circumference against said head, and a metal filling poured into said cavity to fill the free space therein and surrounding and embedding said wire coil.

6. An electric insulator comprising an insulator body provided with a pin cavity having an inwardly flaring wall, a pin provided with an enlarged head at its inner end, a mantle surrounding said pin head and being dimensioned to exceed in diameter the throat of said cavity and being spaced from the wall of said throat to afford unobstructed access to the free space in the cavity, at least two annular wire coils of circular cross section inserted between said mantle and said wall, one beside the other, and bearing with their inner circumference against said mantle, and a metal filling poured into said cavity to fill the free space existing therein in the interior of and between the coils and the windings thereof.

7. An electric insulator comprising an insulator body provided with a pin cavity having an inwardly flaring wall, a pin provided with an enlarged head at its inner end, a mantle surrounding said pin and being dimensioned to exceed in diameter the throat of said cavity and being spaced from the wall of said throat to afford unobstructed access to the free space in the cavity, said mantle being provided with annular peripheral grooves, at least two annular wire coils of circular cross section and of different diameter inserted between said pin and said wall, one opposite the other, their inner circumference disposed in said grooves and bearing against said mantle, and a metal filling poured into said cavity to fill the free space existing therein in the interior of and between said coils and the windings thereof.

8. An electric insulator comprising an insulator body provided with a pin cavity having an inwardly flaring wall, a pin having a composite head exceeding in diameter the throat of said cavity, the parts constituting said head being dimensioned to permit insertion through the throat of said cavity, said head being spaced from the wall of said throat to afford unobstructed access to the free space in the cavity, an annular wire coil of circular cross section inserted between said pin head and said wall and bearing with its inner circumference against said head, and a metal filling poured into said cavity to fill the free space therein and surrounding and embedding said wire coil.

WILHELM REGERBIS.
OTTO PAUL ZIESCHE.